March 31, 1970 R. J. DALTON 3,504,259

AUTOMATIC POSITIONER FOR TESTING SAMPLES

Filed April 11, 1966 3 Sheets-Sheet 1

INVENTOR.
ROBERT J. DALTON

BY

Seidel & Gonda

ATTORNEYS.

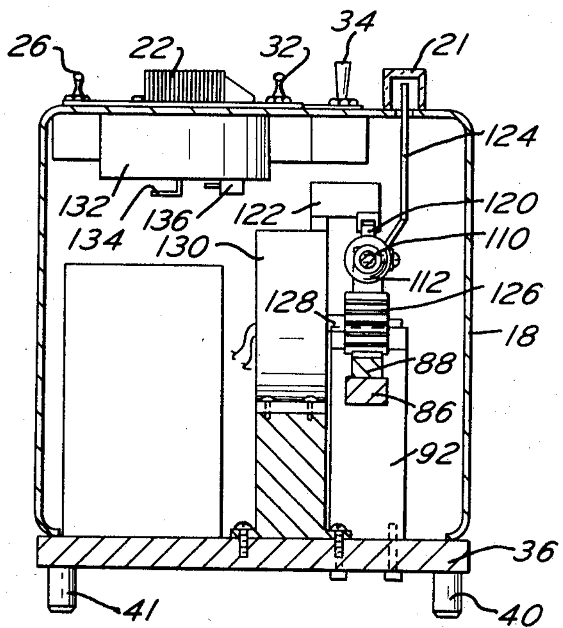
FIG.3
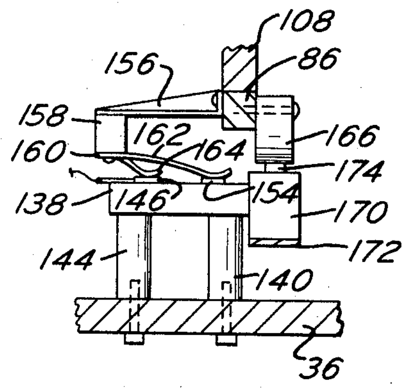
FIG.5
FIG.6
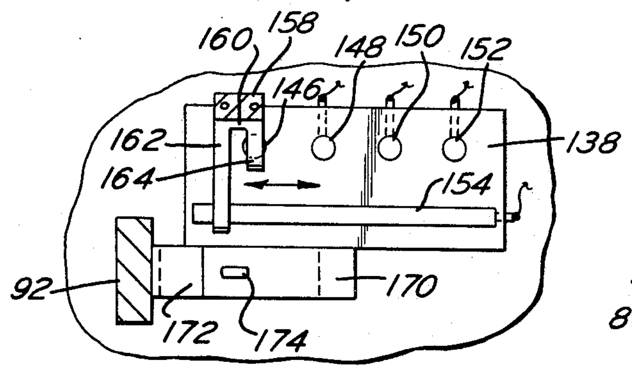
FIG.4
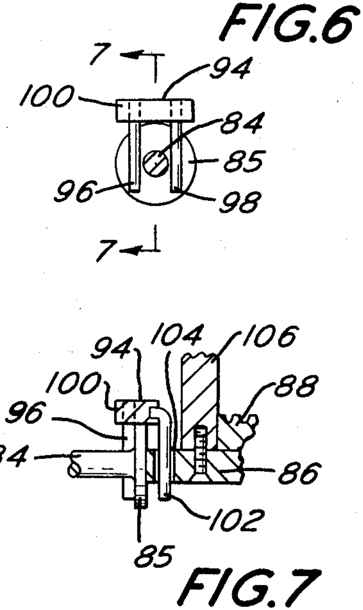
FIG.7
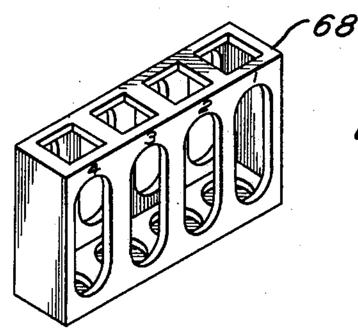
FIG.8
INVENTOR.
ROBERT J. DALTON
BY
Seidel & Gonda
ATTORNEYS.

AUTOMATIC POSITIONER FOR TESTING SAMPLES
Filed April 11, 1966 3 Sheets-Sheet 3
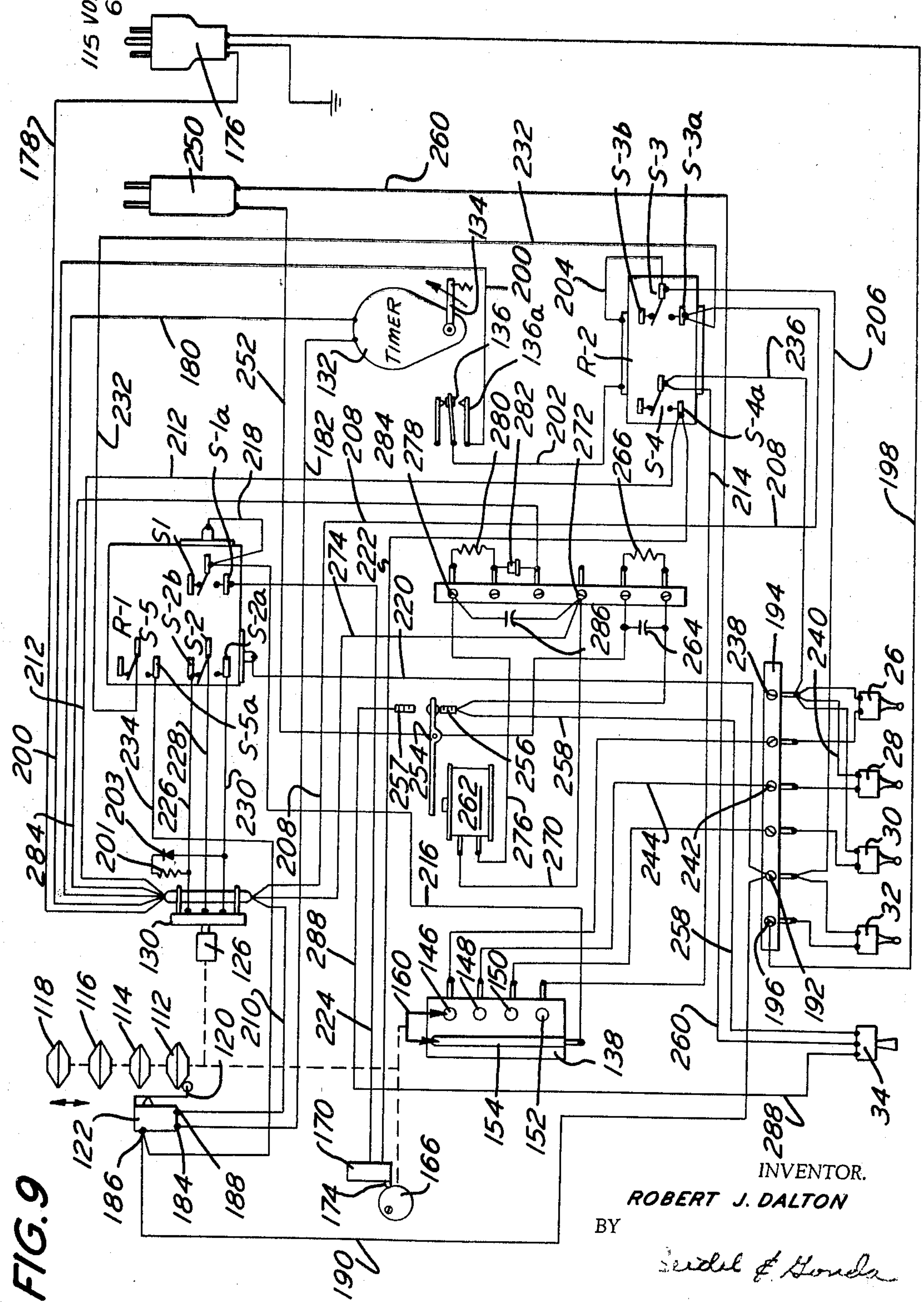
INVENTOR.
ROBERT J. DALTON
BY
Seidel & Gonda
ATTORNEYS.

United States Patent Office 3,504,259

Patented Mar. 31, 1970

3,504,259
AUTOMATIC POSITIONER FOR TESTING SAMPLES

Robert J. Dalton, Haddonfield, N.J., assignor to Arthur H. Thomas Company, Philadelphia, Pa., a corporation of Pennsylvania Filed Apr. 11, 1966, Ser. No. 541,583
Int. Cl. H02p *1/22*
U.S. Cl. 318—265 4 Claims

ABSTRACT OF THE DISCLOSURE

A cell positioner for automatically and successively advancing a plurality of samples into the light beam of a spectrophotometer at predetermined time intervals which may be selectively varied in order to obtain the measurements of the characteristics of the samples. A recorder may be controlled by the movement of the samples.

This invention relates to an automatic cell positioner. More particularly, this invention relates to apparatus for automatically advancing two or more sample cells into the light beam of a spectrophotometer and recycling the same so that the spectrophotometer can make repeated unattended measurements.

In using a spectrophotometer, it is often necessary to make or record measurements on multiple samples, such as in reaction rate studies, continuous flow monitoring of product effluents, etc. In accordance with the present invention, cells are successively advanced at predetermined intervals into the spectrophotometer light beam. Each cell remains in position for a predetermined amount of time before the next cell is advanced into the light beam. The apparatus is provided with means to program the advancement whereby selection of two-cell, three-cell cycles or more can be switched into and out of the program. Means are provided to control the time period each cell is in the light beam. Further, means are provided for controlling a recorder or other apparatus in connection with the movement of the cells.

It therefore is a general object of the present invention to provide an automatic cell positioner.

Yet another object of the present invention is to provide an automatic cell positioner having means to program the number of cells positioned in each cycle.

Still another object of the present invention is to provide apparatus for automatically advancing and positioning two or more cells for a predetermined period of time.

Still another object of the present invention is to provide apparatus for positioning and advancing two or more cells having means to select the number of cells to be positioned.

Still another object of the present invention is to provide apparatus for advancing and positioning cells and means to control the cycle time of advancing and positioning of such cells.

Other objects will appear hereinafter.

For the purpose of illustrating the invention, there is shown in the drawings a form which is presently preferred; it being understood, however, that this invention is not limited to the precise arrangements and instrumentalities shown.

FIGURE 3 is a transverse sectional view of the automatic cell positioner shown in FIGURE 2 taken along the line 3—3.

FIGURE 4 is a partial top plan view of the selector board taken along the line 4—4 of FIGURE 2.

FIGURE 5 is an enlarged and partial elevation view of the selector board taken along the line 5—5 in FIGURE 2.

FIGURE 6 is an enlarged elevation of a connector taken along the line 6—6 in FIGURE 2.

FIGURE 7 is a sectional view of the connector illustrated in FIGURE 6 taken along the line 7—7.

FIGURE 8 is a perspective view of a four-cell holder.

FIGURE 9 is a partial schematic and partial wiring diagram for the electric circuitry used in connection with the cell positioner.

Figure 1:
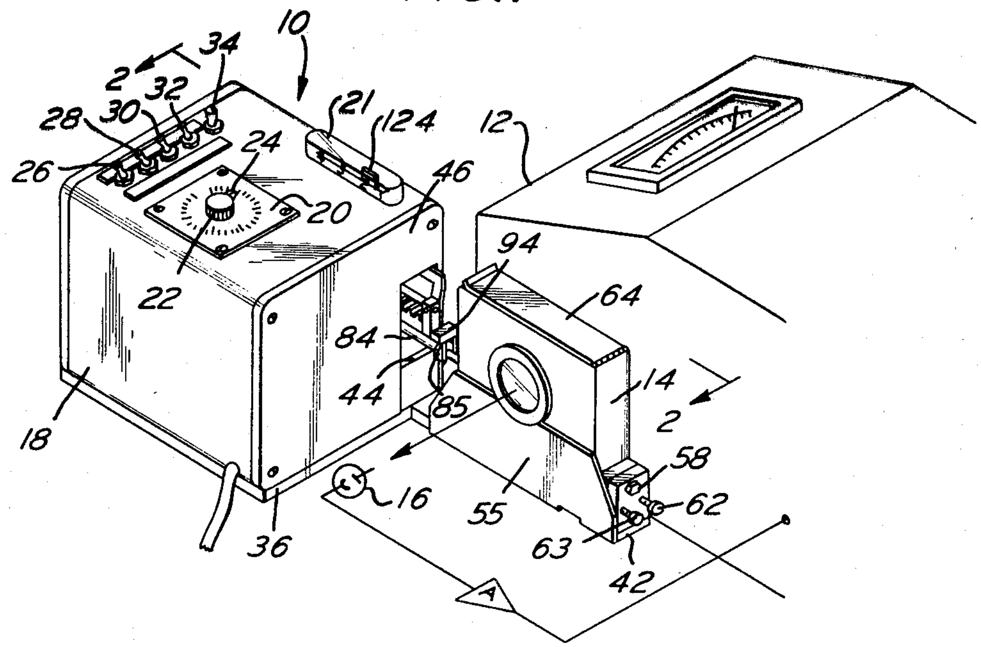
FIGURE 1 is a perspective view showing the automatic cell positioner in operative association with a cell carrier and spectrophotometer.

Referring now to the drawings in detail, there is shown in FIGURE 1 an automatic cell positioner designated generally as 10.

The cell positioner 10 is shown in operative association with a spectrophotometer 12. A multiple cell compartment 14 is supported in alignment with the spectrophotometer light path. Light passing through the spectrophotometer 12 and through the cell compartment 14 impinges upon a photomultiplier or other photosensitive apparatus designated schematically as 16. The spectrophotometer 12, cell compartment 14 and photomultiplier 16 are conventional equipment readily available on the open market and therefore need not be described in detail. Only such elements of the compartment 14 as are necessary to clarify the invention are described.

As shown, the cell positioning mechanism and timing apparatus are contained within a housing 18 on which is mounted a cell position indicator window 21 to inform the user which cell is in the read-out position. The outside of the housing also supports a graduated plate 20 and the timer control knob 22. Knob 22 has a pointer 24 which is positioned in relation to the graduations on the plate 20 to indicate the time period of the timer cycle. By adjusting the position of pointer 24, the operator can control the timer cycle period. Four single-pole-single-throw switches 26, 28, 30 and 32 are mounted on the housing together with a single-pole-double-throw switch 34. Switch 32 acts as a power on-off switch and switch 34 permits control of the recording mechanism or other apparatus as is more fully explained below. Switches 26, 28 and 30 control the number of cells to be positioned in the light beam during one cycle of operation. Switch 26 is operated for two cell cycles; switch 28 for three cell cycles; and switch 30 for four cell cycles. It should be understood that the operative embodiment described herein is for up to four cells, but the apparatus is readily adapted for use with more cells.

Figure 2:
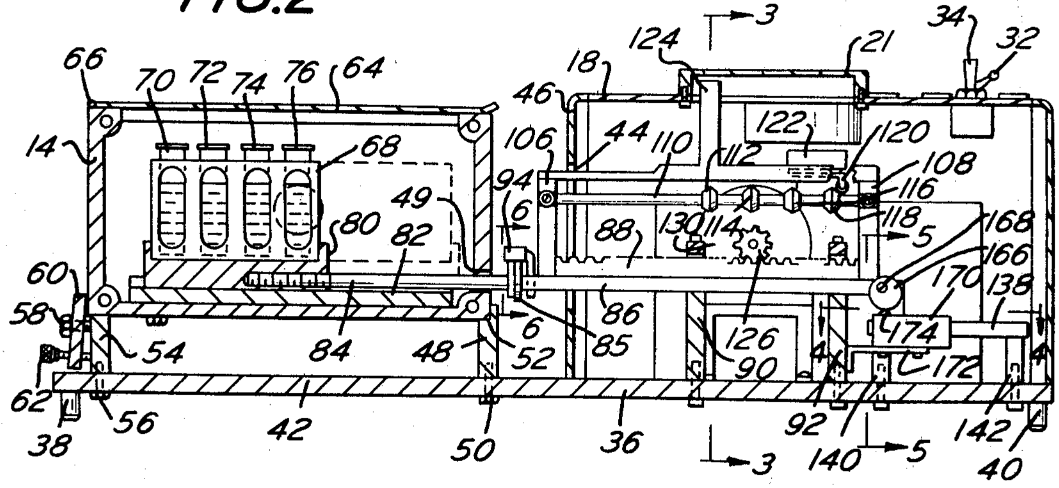
FIGURE 2 is a sectional view of the automatic cell positioner and the cell carrier shown in FIGURE 1 taken along the line 2—2.

Referring now to FIGURES 2 and 3, the cell positioner 10 is shown mounted on a base 36 having legs 38, 40 and 41. A base extension 42 is integrally formed with the base 36 and protrudes laterally from an opening 44 in the side wall 46 of the housing 18. The extension 42 is adapted to be positioned below the opening in spectrophotometer 12 through which the light passes. A cell compartment support 48 extends upwardly and is mounted to the extension 42 by a bolt 50. A right angle shoulder 52 is formed in the top of the upright support 48 and receives one of the lower corners of cell compartment 14. A second cell compartment support 54 is similarly held in an upright position on extension 42 by the bolt 56. The support 54 has no shoulder formed therein and the bottom wall of the cell compartment 14 merely rests thereon. The exit face of compartment 14 is positioned against the wall 55.

A clamping mechanism is mounted on and cooperates with the support 54. Such mechanism comprises an adjustment screw 58 extending through a clamping arm 60 and threadedly engaging the support 54. The screw 58 is in sliding engagement only with the arm 60. A screw 62, having a knurled head, is in threaded engagement with the clamping arm 60 and its forward end abuts the support 54. The arm 60 extends above support 54 so that it can be brought into engagement with the side wall of the cell compartment 14.

The operation of the clamping mechanism should be readily apparent from the foregoing description of its elements. The screw 58 is adjusted to accommodate different sized cell compartments 14. Then the screw 62 is run into the arm 60 so that the arm pivots about the head of screw 58 and its upper end engages the side wall compartment 14. Thus, the side walls of compartment 14 are clamped between the arm 61 and the shoulder 52.

The top wall 64 of cell compartment 14 defines a cover that is pivotable about a hinge 66. By pivoting the top wall 64 open, a cell holder 68 can be placed inside the compartment 14. A detailed perspective view of the cell holder 68 is shown in FIGURE 8. Such cell holders are common items well known in the spectrophotometry art and therefore need not be described in detail. In FIGURE 2, cell holder 68 is shown with four absorption cells 70, 72, 74 and 76 supported therein. The absorption cells 70–76 may be conventional 10 mm. light path cells.

The cell holder 68 is received within a recess formed in the top of slide 80. The recess may be dimensioned to be substantially equal to the outside dimensions of the bottom wall of holder 68. Thus, the holder 68 can be quickly and accurately positioned in the compartment 14 simply by raising the cover 64 and placing the holder 68 in position on the slide 80. The slide 80 is reciprocally positioned on a slide base 82 and guided thereon for longitudinal movement by a dovetail type tongue and groove, not shown. A rod 84 is threadedly engaged in the slide 80 and extends through a hole 49 in the side wall of compartment 14. The distal end of rod 84 terminates in an enlarged head 85 which is more clearly shown in FIGURES 6 and 7. If manual operation of the spectrophotometer 12 is desired, then the cells 70–76 can be positioned in the light path by holding the head 85 and successively positioning one cell after the other in the spectrophotometer light path.

For automatic positioning of the sample cells, the cell positioning mechanism contained within housing 18 may be used. Such mechanism is described in detail below.

As best shown in FIGURES 2 and 3, the automatic cell positioner comprises a rack base 86 on which is mounted the rack 88 by any conventional means such as countersunk screws extending through the base 86 into the bottom of rack 88. The rack base 86 and rack 88 are supported in sliding relationship with a pair of upright supports 90 and 92 which are bolted to the base 36. Openings similar to the outside dimensions of the base 86 and rack 88 are cut in the supports 90 and 92. Thus, the rack 88 can be reciprocated along its longitudinal axis through the supports 90 and 92. The base 86 extends through opening 44 in side wall 46 so that it can be brought into abutting relation with the head 85.

The cell positioner is provided with a coupler 94 for coupling the base 86 with the head 85. The coupler 94 has been specially designed to provide quick and accurate engagement and disengagement of the head 85 and base 86. As best shown in FIGURES 6 and 7, the coupler 94 includes a pair of laterally spaced legs 96 and 98 depending downwardly from a head 100. A third leg 102 is spaced rearwardly and intermediate the legs 96 and 98. The distance between the legs 96, 98 and 102 is adjusted so that the legs 96 and 98 will extend on either side of the rod 84 and abut the inner side of head 85. Leg 102 bends downwardly on the outer side of head 85, and engages base 86 in a hole 104 provided therein. It should be readily apparent that the base 86 can be coupled to the head 85 simply by dropping the coupler 94 in position as shown in FIGURES 6 and 7.

A pair of uprights 106 and 108 are bolted to the base 86 adjacent the ends of rack 88. A cam support rod 110 extends between the uprights 106 and 108 and is fixed thereto. As shown in FIGURE 2, four spaced cams 112, 114, 116 and 118 are adjustably positioned on and supported by the rod 110. The cams are fixed in predetermined positions by set screws. The cams 12–118 are positioned to mechanically engage the toggle arm 120 of a normally closed single pole-double-throw switch 122. The function of switch 122 will be explained below in connection with the detailed description of the electric circuitry. By reciprocating the rack 88, the cams 112–118 successively contact the toggle arm 120 and thereby change the circuit to which its common terminal is connected. The switch 122 is mounted on the casing of the motor 130.

An indicator 124 is mounted on the uprights 106 and 108 and extends upwardly through an opening into the indicator window 21. The numerals 1–4 shown in FIGURE 1 correspond to the number of cells held by the holder 68. The position of indicator 124 informs the operator which cell is in the light path of the spectrophotometer at any particular moment.

A pinion gear 126 is mounted on the shaft 128 of reversible motor 130 and its teeth are meshed with those of rack 88. Reversible motor 130 drives the gear 126 and thereby causes the rack 88 to reciprocate on its supports 90 and 92. If the rack 88 is connected through its base 86 to the rod 84 and slide 80, then the cells 70–76 in holder 68 will be reciprocated through the light beam from spectrophotometer 12.

A timer 132 is mounted to the top wall of housing 18. In the embodiment shown, the timer 132 can be adjusted to provide timing cycles from 0 to 60 seconds. However, it should be recognized that other adjustable timers having longer or shorter maximum period can be used. Timer 132 drives a timing arm 134 which is adapted to contact a single-pole-single-throw switch 136 and close its contacts. The timer 132 drives the timing arm 134 against the bias of a spring so that the arm 134 is returned to its initial position at the end of each timing cycle.

Referring now to FIGURES 2, 4 and 5, the selector control mechanism for programming the number of cells displaced into the spectrophotometer light path is shown. A contact board 138 for the selector control mechanism is mounted on four uprights bolted to the base 36. Only uprights 140, 142 and 144 are shown, it being understood that a fourth upright is provided at the corner of board 138 behind the upright 144 shown in FIGURE 5. The contact board 138 is made from electrical insulating material such as fiber. Four longitudinally aligned contacts 146, 148, 150 and 152 are provided. Such contacts are preferably made of an electrically conductive material such as copper and may be formed on the board 138 by any conventional means. The distance between contacts 146–152 is equal to the distance between cams 112–118. The contact board 138 also supports a contact strip 154 extending along the longitudinal axis of the board parallel to the aligned axis of the contacts 146–152. The contact strip 154 is preferably made of an electrically conductive material such as copper and may be adhered to the board 138 by any conventional means. Electrical conductors are soldered or otherwise connected to each of the contacts 146–152 and the contact strip 154.

A bracket 156 is connected to the rack base 86 and extends laterally therefrom. A block of fiber insulating material 158 is supported on the distal end of bracket 156. Block 158 may be connected to bracket 156 and bracket 156 connected to rack base 86 by any conventional means, such as rivets. A bifurcated contact brush 160 is connected to the bottom wall of block 158 by rivets or any other conventional means. Brush 160 is made of a resilient electrically conductive material such as a bronze steel alloy and its arms 162 and 164 are spring urged towards the contact board 138. The longer arm 162 is urged against the contact strip 154 and the shorter arm 164 is urged against the contacts 146–152. It should be readily apparent that the bifurcated brush 160 thereby provides an electrical connection between contacts 146–152 and said contact strip 154.

Because brush 160 is supported by the rack base 86, it is reciprocated with it and moves parallel to the longitudinal axis of the contact board 138. Also connected to the end of rack base 86 is a cam 166. Cam 166 is eccentrically mounted to the rack base 86 by a threaded screw 168 extending therethrough and engaging said base 86. As thus mounted, the minimum distance between the periphery of cam 166 and base 36 is adjustable.

A normally closed single-pole-single-throw switch 170 is supported below the cam 166 by a bracket 172 connected to the support 92. The switch contact arm 174 protrudes above the switch 170 a sufficient distance to be mechanically contacted by the cam 166. When cam 166 engages arm 174, the terminals of the switch are disconnected. The position of cam 166 and contact arm 174 is such that switch 170 is operated when the rack 88 is in its forwardmost position with contact 160 connecting strip 154 to contact 146.

Referring now to FIGURE 9, a combination schematic and wiring diagram is illustrated. The diagram also includes sufficient mechanical structure to illustrate the operation of the cell positioner. The function of the circuit elements will be described simultaneously with the description of FIGURE 9.

With rack 88 positioned as shown in the drawings, the electrical circuit is connected to a commercial alternating source by voltage by the grounded male connector 176. The circuit includes conductor 178 and one terminal of the electric motor 130. The same terminal of motor 130 is connected by conductor 180 to timer 132, which is connected by the conductor 182 to one terminal of the single-pole-double-throw switch 122. The rack 88 is positioned so that the cam 112 abuts the toggle arm 120 which thereby connects terminal 184 of switch 122 to the common terminal 186. When no cam is in contact with toggle arm 120, the terminal 188 is connected to common terminal 186. Terminal 186 is connected through conductor 190 to a connector 192 on terminal strip 194. Strip 194 is made of an insulating material and supports a plurality of terminals. Connector 192 is connected through off-on power switch 32 to conductor 198 through connector 196. Conductor 198 is connected to the source.

Timer 132 will have been preset for a predetermined period of operation. Since it is now energized, the timing arm 134 will begin to rotate and engage the single-pole-single-throw switch 136 at the end of the timing period. The switch arm will be forced from the position shown in FIGURE 9 into contact with the lower terminal. This will complete a circuit that will energize relay R–2. The circuit will be through conductor 178 to the input terminal of motor 130, through conductor 200 to contact **136*a* of switch 136, through conductor 202 to the coil of relay R–2, through relay R–2 and jumper 204 to the common terminal of switch S–3 on relay R–2, through conductor 206 to connector 192, and then through power switch 32 and back to the source through conductor 198**.

When relay R–2 energizes, switch S–3 connects its common terminal through the lowermost terminal S–3*a*. In FIGURE 9, the common terminal is shown connected to the upper terminal S–3*b* which is the normal position prior to energization. By energizing relay R–2, a circuit for motor 130 is completed through conductor 178, through the motor, through conductor 208, through relay switch S–3, through conductor 200, through switch 32, and then back to the source through conductor 198.

Arm 134 remains in engagement with switch 136 for a sufficient amount of time to permit motor 130 to rotate pinion gear 126 and thereby displace rack 88 until cam 112 moves out of engagement with toggle arm 120. Thereafter, the motor 130 remains energized and continues to rotate the pinion gear in the same direction. The circuit now energizing motor 130 includes conductor 178, the motor 130, conductor 210, switch 122, now connected between common terminal 186 and terminal 188, conductor 190, connector 192, switch 32, and conductor 198.

Once switch 122 breaks its connection between terminal 184 and 186, the timer 132 is no longer energized and the spring bias on arm 134 returns it to its starting position. This of course opens switch 136 and de-energizes relay R–2.

The motor 130 will continue to drive the cams 112 and 118 until cam 114 contacts arm 120 thereby breaking the motor circuit through switch 122. By properly positioning cams 112, 114, 116 and 118 on rod 110, the motor 130 can be made to stop the displacement of slide 80 with the cell 74 positioned in the spectrophotometer light path. It is assumed that the starting position of the apparatus in with the cell 76 in the light path.

If desired, appropriate damping circuitry can be connected to the motor to assure that it stops precisely in the required position. Such circuitry includes the resistor 201 and diode 203 connected to the field control poles of the motor. The resistor and diode provide a reversing magnetic field when the motor is de-energized. The size of the field is sufficient to prevent coasting.

When cam 114 engages toggle arm 120, the switch 122 again connects terminal 184 to terminal 186. Thus, the timer 132 is again energized and the circuit and apparatus functions once again as heretofore described. At the end of the predetermined timing period, the cell motor 130 will again be energized and drive the slide 80 until it positions the cell 72 in the spectrophotometer light path. Then the circuit again repeats itself and the cell 70 is positioned in the light path.

At this point, the cell positioner begins operation as it has during each of the previous cell positioning functions. The timer 132 is energized through switch 122 and at the end of the predetermined timing period, arm 134 closes switch 136 and energizes relay R–2. However, the motor is now energized to operate in the reverse direction through the following circuit.

With cam 118 in contact with toggle arm 120, the brush 160 will be in position to connect the contact strip 154 to the contact 152. Therefore, a circuit will be completed through conductor 178, conductor 212, the lower terminal S–4*a* on switch S–4 of previously energized relay R–2, conductor 214, contact 152, brush 160, terminal strip 154, conductor 216, the common contact of switch S–1 in reversing relay R–1, jumper 218, the coil of relay R–1, conductor 220, contact 192, power switch 32, and conductor 198.

Once reversing relay R–1 energizes, it locks upon itself through a circuit including conductor 178, conductor 212, conductor 222, switch 170, conductor 224, the lower contact S–1*a* of switch S–1 on reversing relay R–1, the coil of relay R–1, conductor 220, connector 122, power switch 32, and conductor 198.

Switch S–2 on reversing relay R–1 is connected to the field control windings of motor 130. By connecting the common terminal of switch S–2 to the upper terminal S–2*b*, conductors 228 and 226 form a common circuit. This energizes the motor 130 to drive it in the forward direction whereby cams 112–118 are successively driven past the toggle arm 120 in that order. The conductor 228 is connected through the motor to the input terminal thereof. When reversing relay R–1 is energized, the common contact of switch S–2 connects conductors 228 and 230, thereby energizing the motor 130 to drive it in the opposite or reverse direction. Thus, the cams 118–112 are moved past the toggle arm 120 in that order.

With the reversing relay R–1 locked in its energized condition, the conductors 228 and 230 are connected and the motor drives the cams back to their starting position whereat cam 112 is in engagement with toggle arm 120 and brush 160 connects contact 146 to strip 154. The circuit for energizing the motor while it is being driven in the reverse direction comprises conductor 178, conductor 208, the lower terminal S–3a of switch S–3 on relay R–2, conductor 232, the common terminal on switch S–5 of reversing relay R–1, terminal S–5a, conductor 234, conductor 190, connector 192, switch 32, and back to the source through conductor 198. It should be noted that the circuit for running the motor in the reverse direction avoids switch 122. Thus, the motor drives the cell positioner apparatus back to its starting position without having to stop each time one of the cams 112–118 contacts the toggle arm 120 as it does in the forward direction. Of course, the cell positioner could be run thusly by removing the switch S–5 from the circuit.

When the motor 130 drives the cam 112 into engagement with toggle arm 120, the cam 166 simultaneously contacts the arm 174 on switch 170 and opens the same. This breaks the energizing circuit for reversing relay R–1. The switches S–1, S–2 and S–5 therefore return to the position shown in FIGURE 9 and the motor comes to rest with the cell 76 in the spectrophotometer light path.

If desired, the cell positioner can be programmed to reverse itself after two, three or four cells have been positioned in the spectrophotometer light path. Since the programming operation and resulting circuit is the same for any number of cells, only one such circuit is described. In general, the number of cells to be positioned is controlled by closing single pole switch 26 for one or two cells, switch 28 for three cells, and switch 30 for four cells. By way of example, the circuit for three cells is described.

Circuit operation is begun as heretofore described. That is, the cell positioner first displaces the cell 76 into the light path of the spectrophotometer, then cell 74 is so displaced and finally cell 72 is positioned in the light path. At this point, the circuit function changes. Switch 28 will have been previously closed. At the end of the timing period, timer 134 will move arm 134 against switch 136 and thereby energize relay R–2 as described above. Because switch 28 has been previously closed, a circuit is completed to energize relay R–1. The energizing circuit includes conductor 178, conductor 212, switch S–4, conductor 236, connector 238, conductor 240, switch 28, connector 242, conductor 244, contact 148, brush 160, strip 154, conductor 216, the coil of reversing relay R–1, conductor 220, connector 192, switch 32, connector 196, and conductor 198.

From the foregoing, it should be apparent that the reversing relay R–1 has been energized and the motor 130 will now drive the cams in the reverse direction. The operation of the circuit is the same as that previously described for the automatic reversing action accomplished when brush 160 connects contact 152 to strip 154. Those skilled in the art will readily recognize that the motor 130 is reversed in the same manner when either switch 26 or switch 30 is closed.

In using the cell positioner, it may be desirable to operative associative equipment. For example, it may be desirable to control a recorder such that it is operative only when a cell is positioned in the spectrophotometer light path. This will eliminate the necessity for interpreting the data to eliminate spurious recordings made during the cell shifting operation. It may also be desirable to operate other control apparatus. The present invention can be used to make measurements on flow cells which have been substituted for the cells 70–76. In this latter case, it may be desirable to control a solenoid valve to start and stop the fluid flow as the cells are shifted into and out of the spectrophotometer light path.

A circuit for controlling a recorder is described below.

The following circuit switches the recorder on and off. A two-pole plug 250 is connected to the recorder. One side of the plug is connected through conductor 252, common switch contact 254, contact 256, conductor 258, single-pole-double-throw switch 34, and conductor 260 back to the plug 250. A relay coil 262 is provided to generate a magnetic field which pivots the common contact 254 about a fulcrum and moves it out of contact with contactor 256. A capacitor 264 and resistor 266 are connected in parallel with each other and in parallel with the contacts 254 and 256. This parallel resistance-capacitance circuit prevents arcing when the relay coil 262 breaks the connection between common contact 254 and contact 256.

The circuit drawn in FIGURE 9 illustrates the common contact in position to energize a recorder. It is desirable that the recorder be shut down when the cells are being shifted into and out of the spetrophotometer light path. Accordingly, the relay coil 262 is connected in parallel with the terminals of motor 130. Thus, one coil is connected through conductor 270 to connector 272, and connector 272 is connected through conductor 274 to the lower terminal of motor 130. The other terminal of coil 262 is connected through conductor 276 to connector 278. Connector 278 is connected in series with resistor 280 and diode 282. Diode 282 is connected through conductor 284 to the upper terminal of motor 130. A capacitor 286 is connected in parallel across the terminals of coil 262.

Because the relay coil 262 is connected in parallel with motor 130, it will be energized each time the motor operates. This will therefore break the contact between common contact 254 and fixed contact 256 and open the recorder circuit.

Capacitor 286 together with resistor 280 and diode 282 serve to provide a delay circuit. The circuit is designed to delay the de-energization of coil 262 until the motor 130 has completely stopped. Thus, the recorder connected to plug 250 is not brought into the circuit until the cell is properly positioned in the spectrophotometer light path. The circuit function of resistor 280, diode 282 and capacitor 286 should be readily apparent. A capacitor 286 charges while the motor is energized. As soon as the motor is de-energized, the diode 282 blocks the discharge of capacitor 286 except through the coil 262.

If desired, the single-pole-double-throw switch can be moved to a position wherein it connects conductor 260 to conductor 288. In this position, the contact 254 will complete a circuit through conductor 252, contact 254, contact 257, conductor 288, switch 34, and conductor 260 when the motor 130 is energized.

The present invention may be embodied in other specific forms without departing from the spirit or essential attributes thereof and, accordingly, reference should be made to the appended claims, rather than to the foregoing specification as indicating the scope of the invention.

I claim:

1. Repetitive displacing and positioning apparatus comprising a reciprocable connector rod, motor means for driving said connector rod in a forward and reverse direction, and control means for controlling the actuation of said motor, said control means including a timer for actuating a first switch at predetermined intervals, said switch being in circuit connection with said motor for connecting said motor to a source of energy, a plurality of switch operating cams reciprocable with and connected to said rod, a second switch positioned to be actuated by said cams, said second switch being in circuit connection with said motor to connect said motor to a source of energy when said switch is out of engagement with said cams, said second switch being connected in circuit relation with said motor to disconnect said motor from a source of energy when said second switch is in engagement with one of said cams, said cams being positioned to engage said second switch and remove the connection between said motor and said source of energy at predetermined intervals in the forward displacement of said rod, reversing switch means for reversing the direction of said motor to reciprocate said rod, a plurality of selectively operable switches in circuit connection with said reversing switch means for actuating said reversing switch means, and position switch means in circuit relation with said selectively operable switch means for connecting said selectively operable switch means to said third switch means, said position switch means including a plurality of contacts individually connected to said selectively operable switches, a common contact and a displaceable contact, means for displacing said displaceable contact by the displacement of said rod, said plurality of contacts and said displaceable contact being positioned to connect said plurality of contacts to said reversing switch means in accordance with the position of said rod, third switch means for disconnecting said reversing switch means from circuit connection when said rod has been reciprocated to an initial position, said third switch means including a normally closed switch and a cam displaceable by said rod, said cam being positioned to open said normally closed switch when said rod has been reciprocated to its initial position, and automatic reverse control means for reciprocating said rod to its initial position when said program switches are open.

2. Repetitive displacing and positioning apparatus comprising reciprocable connector means, a motor for driving said connector means in a forward and reverse direction, and control means for controlling the actuation of said motor, said control means including motor actuating and de-actuating means to displace said connector forward in discrete steps from an initial position, and motor reversing means to reciprocate said connector to the initial position, said motor reversing means including timer means, first switch means to connect said motor to a source of energy, reversing switch means for reversing said motor, and position switch means for initiating said reversing switch means, said position switch means including a plurality of spaced contacts in a contactor displaceable in response to the displacement of said connector, and a plurality of program switch means connected intermediate said contacts and said reversing switch means for selectively initiating said reversing switch means in relation to the position of said connector means.

3. Repetitive displacing and positioning apparatus comprising reciprocable connector means, a motor for driving said connector means in a forward and reverse direction, and control means for controlling the actuation of said motor, said control means including motor actuating and de-actuating means to displace said connector forward in discrete steps from an initial position, and motor reversing means to reciprocate said connector to the initial position, said control means including timing means for determining the time period between displacement steps, first switch means responsive to said timing means to connect said motor to a source of energy, second switch means operative by displacement of said connector to hold said motor in connection with a source of energy and cam means displaced by said connector for opening said second switch means and disconnecting said motor from said energy source at predetermined intervals, said motor reversing means including said timer means, reversing switch means for reversing said motor, and position switch means for initiating said reversing switch means, said position switch means including a plurality of spaced contacts in a contactor displaceable in response to displacement of said connector, and a plurality of program switch means connected intermediate said contacts and said reversing switch means for selectively initiating said reversing switch means in relation to the position of said connector means.

4. A cell positioner for successively positioning a plurality of sample cells in the path of an electromagnetic wave; comprising a reciprocable mechanical connector for connecting said cell positioner to a displaceable sample holder for said sample cells; reversible motor means for reciprocably displacing said mechanical connector; and electrical connector means for controlling the energization of said motor means to successively advance said mechanical connector from position to position in one direction and then continuously drive said mechanical connector back to a starting position after said mechanical connector has reached a preselected position, said control means including a first switch means for connecting said motor to a source of driving energy, timing means for actuating said switch means at preset intervals, and recycling means for directly returning said mechanical connector to an initial position, said recycling means including second switch means for selecting the position at which said mechanical connector is recycled, said second switch means including a plurality of selectively operable switches connected to a contact board, contact brush means reciprocable with said electrical connector means for successively connecting contacts on said board with a common contact, said recycling means being connected through said plurality of selectively operable switch means to said contact and said contacts being connected to said first switch means by said brush means and common contact.

References Cited

UNITED STATES PATENTS

| | | | |
|---|---|---|---|
| 2,229,988 | 1/1941 | Pitt et al. | 318—265 |
| 2,735,065 | 2/1956 | Mueller | 318—282 |
| 3,045,165 | 7/1962 | Littwin | 318—286 |

ORIS L. RADER, Primary Examiner

K. L. CROSSON, Assistant Examiner

U.S. Cl. X.R.

318—282, 286, 444, 446